(12) United States Patent
Xiang et al.

(10) Patent No.: US 11,908,244 B2
(45) Date of Patent: Feb. 20, 2024

(54) HUMAN POSTURE DETECTION UTILIZING POSTURE REFERENCE MAPS

(71) Applicant: BIGO TECHNOLOGY PTE. LTD., Singapore (SG)

(72) Inventors: Wei Xiang, Guangzhou (CN); Yifeng Wang, Guangzhou (CN); Qiushi Huang, Guangzhou (CN); Zhujin Liang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 442 days.

(21) Appl. No.: 17/297,882

(22) PCT Filed: Nov. 20, 2019

(86) PCT No.: PCT/CN2019/119633
§ 371 (c)(1),
(2) Date: May 27, 2021

(87) PCT Pub. No.: WO2020/108362
PCT Pub. Date: Jun. 4, 2020

(65) Prior Publication Data
US 2022/0004744 A1 Jan. 6, 2022

(30) Foreign Application Priority Data
Nov. 27, 2018 (CN) .......................... 201811427578.X

(51) Int. Cl.
*G06V 40/00* (2022.01)
*G06V 40/20* (2022.01)
(Continued)

(52) U.S. Cl.
CPC ............ *G06V 40/23* (2022.01); *G06F 18/214* (2023.01); *G06T 7/251* (2017.01); *G06T 2207/20084* (2013.01)

(58) Field of Classification Search
CPC .................... G06V 40/23; G06T 7/251; G06T 2207/20084; G06F 18/214
See application file for complete search history.

(56) References Cited

U.S. PATENT DOCUMENTS 8,437,506 B2 * 5/2013 Williams .............. A63F 13/213
348/46
2012/0057761 A1 3/2012 Li et al.
(Continued)

FOREIGN PATENT DOCUMENTS

CN 107798313 A 3/2018
CN 107832708 A 3/2018
(Continued)

OTHER PUBLICATIONS

International Search Report of the International Searching Authority for China National Intellectual Property Administration in PCT application No. PCT/CN2019/119633 dated Feb. 20, 2020, which is an international application corresponding to this U.S. application.
(Continued)

*Primary Examiner* — Pakee Fang
(74) *Attorney, Agent, or Firm* — Kolitch Romano Dascenzo Gates LLC

(57) ABSTRACT

Provided is a human posture detection method including: acquiring a plurality of frames of image data; acquiring a plurality of human posture reference maps output by a human posture detection model responsive to inputting a current frame of image data to the human posture detection model with reference to human posture confidence maps of a previous frame of image data, wherein different human posture reference maps correspond different human-posture key points; identifying a human-posture key point in each of the human posture reference maps; and generating human posture confidence maps of the current frame of image data based on credibility of the human-posture key points,
(Continued)

wherein the human posture confidence maps of the current frame of image data is configured to participate in generation of human posture confidence maps of a next frame of image data.

18 Claims, 5 Drawing Sheets

(51) Int. Cl.
    *G06T 7/246* (2017.01)
    *G06F 18/214* (2023.01)

(56) References Cited

U.S. PATENT DOCUMENTS

| | | | | |
|---|---|---|---|---|
| 2015/0294143 | A1* | 10/2015 | Wells | G06V 40/23 348/159 |
| 2018/0024641 | A1* | 1/2018 | Mao | A63F 13/428 382/103 |

FOREIGN PATENT DOCUMENTS

| | | |
|---|---|---|
| CN | 108399367 A | 8/2018 |
| CN | 108710868 A | 10/2018 |
| CN | 108846365 A | 11/2018 |
| CN | 108875492 A | 11/2018 |
| CN | 108875523 A | 11/2018 |
| CN | 109344755 A | 2/2019 |
| CN | 109558832 A | 4/2019 |
| EP | 3203412 A1 | 8/2017 |

OTHER PUBLICATIONS

The State Intellectual Property Office of People's Republic of China, First Office Action in Patent Application No. CN201811427578.X dated Aug. 27, 2020, which is a foreign counterpart application corresponding to this U.S. Patent Application, to which this application claims priority.

The State Intellectual Property Office of People's Republic of China, Second Office Action in Patent Application No. CN201811427578.X dated Dec. 1, 2020, which is a foreign counterpart application corresponding to this U.S. Patent Application, to which this application claims priority.

Notification to Grant Patent Right for Invention of Chinese Application No. 201811427578.X dated Feb. 25, 2021.

* cited by examiner

HUMAN POSTURE DETECTION UTILIZING POSTURE REFERENCE MAPS

This application is a US national stage of international application No. PCT/CN2019/119633, filed on Nov. 20, 2019, which claims priority to Chinese Patent Application No. 201811427578.X, filed on Nov. 27, 2018, and entitled "BODY POSTURE DETECTION METHOD, APPARATUS AND DEVICE, AND STORAGE MEDIUM. Both applications are herein incorporated by reference in their entireties.

TECHNICAL FIELD

Embodiments of the present disclosure relate to human posture detection technologies, more particularly, relates to a human posture detection method and apparatus, a device and a storage medium.

BACKGROUND

Human posture detection, as the most challenging research direction in the field of computer vision, has been widely used in fields such as man-machine interaction, intelligent monitoring, virtual reality, and body behavior analysis. However, partial image features where various key points making up a human posture are disposed are subjected to multi-scale affine transformation, and an image is easily affected by factors such as the dressing of a target person, the shooting angle of a camera, the distance, light changes and the partial shielding, so that the study on the detection of human postures has made slow progress.

In related technologies, a human posture detection is performed based on a convolutional neural network. Meanwhile, to achieve higher identification accuracy, it is usually necessary to collect a large number of training samples to perform long-term supervision and learning of a human posture detection model.

SUMMARY

Embodiments of the present disclosure provide a human posture detection method, and apparatus, device, and a storage medium.

In a first aspect, the embodiments of the present disclosure provide a human posture detection method. The method includes: acquiring a plurality of frames of image data; acquiring a plurality of human posture reference maps output by a human posture detection model responsive to inputting a current frame of image data to the human posture detection model with reference to human posture confidence maps of a previous frame of image data, wherein different human posture reference maps correspond different human-posture key points; identifying a human-posture key point in each of the human posture reference maps; and generating human posture confidence maps of the current frame of image data based on credibility of the human-posture key points, wherein the human posture confidence maps of the current frame of image data is configured to participate in generation of human posture confidence maps of a next frame of image data.

In a second aspect, the embodiments of the present disclosure further provide a device. The device includes: at least one processor; and a memory configured to store at least one program, wherein the at least one processor, when running the at least one program, is caused to perform the method as defined in the first aspect of the embodiments of the present disclosure.

In a third aspect, the embodiments of the present disclosure further provide a computer-readable storage medium storing at least one computer program therein, wherein the computer program, when run by a processor, causes the processor to perform the method the method as defined in the first aspect of the embodiments of the present disclosure.

DETAILED DESCRIPTION

Figure 1:
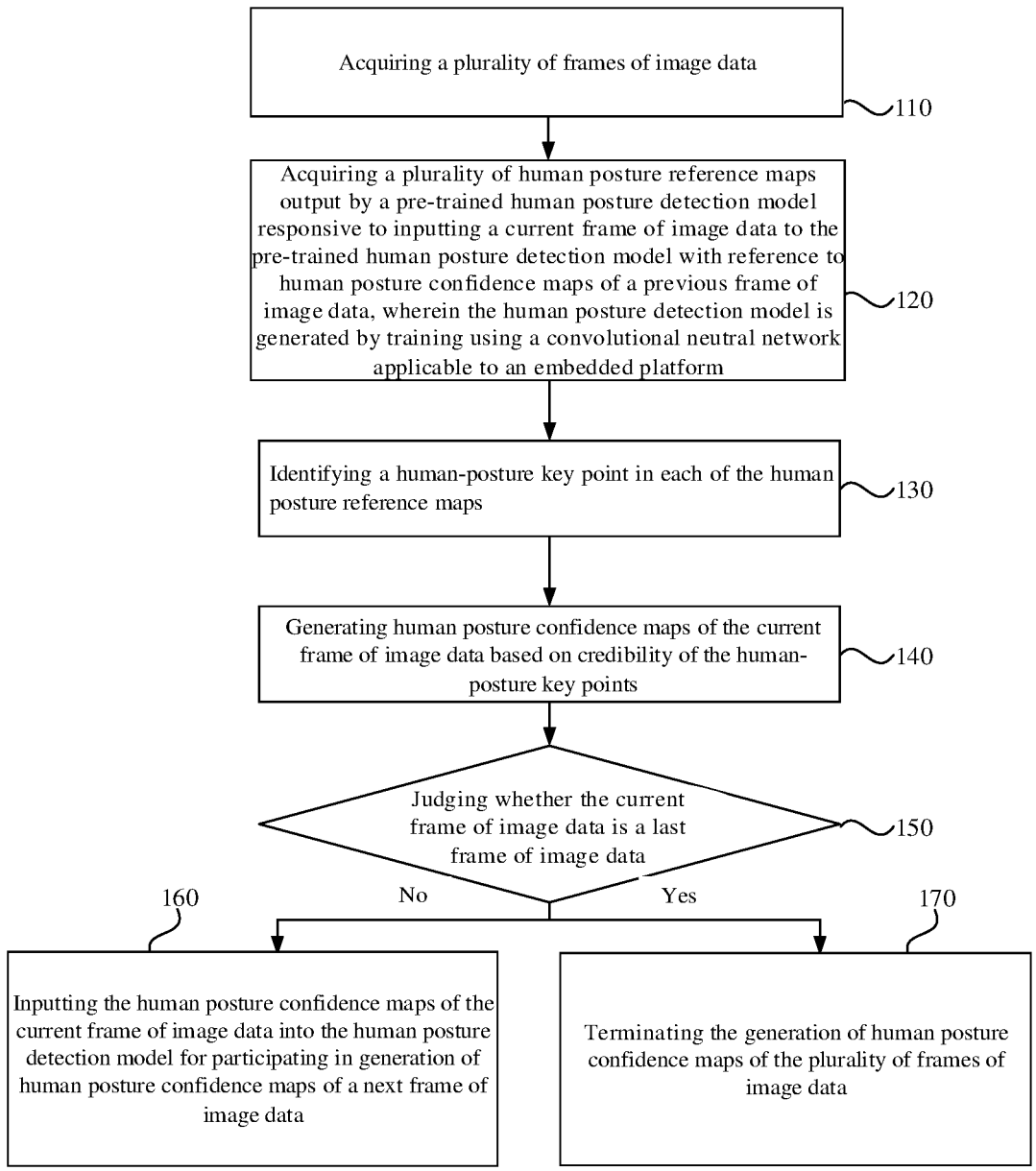
FIG. 1 is a flowchart showing a human posture detection method according to an embodiment of the present disclosure.

The so-called computer vision is to simulate a visual function of a human being by a computer, which may be then enabled to understand the objective world through observation like the human being. The computer vision mainly studies how to make use of computer vision technologies to solve relevant problems around human beings, including object identification, face identification, human detection and tracking, human posture detection, human motion analysis and the like. Human posture detection is an important part of human behavior identification, and is also an important research content of human behavior identification systems, with an ultimate goal of outputting the structural parameters of overall or partial limbs of a human being, such as the contour of a human body, the position and orientation of the head, and the position or part category of a key human point. It has important applications in many aspects, for example, athlete action identification, animated character production, and content-based image and video retrieval.

With regard to the human posture detection, a human body is regarded as consisting of different components connected by key points, and the human posture detection is determined by acquiring position information of each key point, wherein the position information of the key point is represented by two-dimensional plane coordinates. For the human posture detection, a total of 14 key points need to be acquired, including the head, neck, left shoulder, right shoulder, left elbow, right elbow, left wrist, right wrist, left hip, right hip, left knee, right knee, left ankle and right ankle of a human body.

In traditional technologies, a human posture detection method based on a convolutional neural network is adopted for human posture detection, wherein the core problem to be solved by the convolutional neural network is how to automatically extract and abstract a feature, and then map the feature to a task target to solve actual problems. The convolutional neural network generally consists of the following three parts: the first part is an input layer, the second part is composed of a convolutional layer, an excitation layer and a pooling layer (or a down-sampling layer), and the third part is composed of a fully connected multi-layer perceptron classifier. The convolutional neural network has the characteristic of weight sharing, which refers to extract the same feature at different positions in an entire image through a convolution operation of one convolution kernel, that is to say, the same targets at different positions in one piece of image data are basically the same in local features. It can be understood that only one feature may be obtained by using one convolution kernel, and the feature of image data may be extracted by setting up multi-core convolution and learning different features with each convolution kernel. it can be understood that during image processing, the convolutional layer plays a role of extracting and aggregating low-level features into high-level features, wherein low-level features are basic features, such as texture, edge and other local features; and high-level features such as human faces and the shape of an object may better present global properties of a sample. This process is the level generalization of the target object by the convolutional neural network.

In related technologies, during performing the human posture detection based on a convolutional neural network, the human posture detection process between different image data is independent of each other, resulting in low accuracy of human posture detection. Especially, during performing the human posture detection in the video, there will be a problem that the detection results of the human posture corresponding to adjacent image frames are too different.

Further, the applicant found that there are at least the following problems in the related technologies: there is no graphics processing unit (GPU) in an embedded platform to optimize the convolution operation with the largest amount of computation in the convolutional neural network, therefore, a large number of a human posture detection methods based on the convolutional neural network cannot be applied to the embedded platform.

It can be understood that, for a human posture detection method based on the convolutional neural network to be operated on the embedded platform, the convolutional neural network needs to be low in the amount of computation and high in running speed, and to meet the actual requirements for prediction accuracy.

To avoid the situation that the human posture detection method based on the convolutional neural network cannot be successfully operated on the embedded platform, the convolutional neural network may be considered to be improved. For example, a lightweight convolutional neural network may be used. The convolutional neural network according to the embodiments of the present disclosure refers to the lightweight convolutional neural network. The so-called lightweight convolutional neural network refers to a convolutional neural network that is applicable to the embedded platform.

The human posture detection method is described below in combination with specific embodiments.

FIG. 1 is a flowchart showing a human posture detection method according to an embodiment of the present disclosure. This embodiment is applicable to the human posture detection. The method may be executed by a human posture detection apparatus. The apparatus is implemented in software and/or hardware. The apparatus may be configured in a device, such as a computer or a mobile terminal. As shown in FIG. 1, the method includes steps 110 to 170.

In step 110, a plurality of frames of image data is acquired.

In the embodiments of the present disclosure, the video is understood as consisting of at least one frame of image data. In order to identify a human posture in the video, the video may be divided into image data frame by frame, and each frame of image data is analyzed, respectively. Here, the plurality of frames of image data indicates image data in the same video, in other words, the video includes a plurality of frames of image data. The plurality of frames of image data is named in a chronological order. Illustratively, if the video includes N frames of image data, with N≥1, in this way, the N frames of image data are referred to as: a first frame of image data, a second frame of image data, . . . , an $(N-1)^{th}$ frame of image data and an $N^{th}$ frame of image data, in a chronological order.

It can be understood that in a case where the video is divided into a plurality of frames of image data, each frame of image data is processed sequentially in a chronological order. Meanwhile, a certain frame of image data being processed currently is referred to as a current frame of image data; a frame of image data prior to the current frame of image data is referred as a previous frame of image data; and a frame of image data next to the current frame of image data is referred to as a next frame of image data. It can be understood that if the current frame of image data is the first frame of image data, there is only the next frame of image data but no previous frame of image data for the current frame of image data; if the current frame of image data is the last frame of image data, there is only the previous frame of image data but no next frame of image data for the current frame of image data; and if the current frame of image data is neither the first frame of image data nor the last frame of image data, there are both the previous frame of image data and the next frame of image data for the current frame of image data.

The reason for processing each frame of image data sequentially in the chronological order lies in that for the human posture detection, a certain correlation may exist between two adjacent frames of image data, that is, if it is identified from the previous frame of image data that a key point appears at a certain position in the previous frame of image data, the key point may also appear near the same position in the current frame of image data. That is to say, if a detection result of the previous frame of image data satisfies a preset condition, the current frame of image data may be processed by referring to the detection result of the previous frame of image data.

In step 120, a plurality of human posture reference maps output by a human posture detection model are acquired responsive to inputting a current frame of image data to the human posture detection model with reference to human posture confidence maps of a previous frame of image data.

In the embodiments of the present disclosure, the human posture confidence map refers to an image including a human-posture key point, or the human posture confidence map is understood as an image generated based on the human-posture key point, such as an image generated with the human-posture key point as a center. The human-posture key point described here may refer to the 14 key points including the head, neck, left shoulder, right shoulder, left elbow, right elbow, left wrist, right wrist, left hip, right hip, left knee, right knee, left ankle and right ankle as described above.

The human posture reference map includes position information of a plurality of points that may act as the human-posture key point and probability values corresponding to the position information. The points that may act as the human-posture key point are referred to as candidate points.

Accordingly, the human posture reference map includes the position information of a plurality of candidate points and the probability values corresponding to the position information. Each candidate point corresponds to one probability value, and the position information is represented in a form of coordinates. Meanwhile, which candidate point is taken as the human-posture key point may be determined based on the probability values corresponding to the position information of the plurality of candidate points. Illustratively, a candidate point corresponding to a maximum probability value among the plurality of probability values corresponding to the position information of the plurality of candidate points is selected as the human-posture key point. For example, a human posture reference map includes: position information $(x_A, y_A)$ of a candidate point A and a corresponding probability value $P_A$; position information $(x_B, y_B)$ of a candidate point B and a corresponding probability value $P_B$; position information $(x_C, y_C)$ of a candidate point C and a corresponding probability value $P_C$, wherein $P_A<P_B<P_C$, and the candidate point C is determined as the human-posture key point.

It should be noted that each human posture confidence map corresponds to one human-posture key point, and each human posture reference map includes a plurality of candidate points. The candidate points are candidate points for a certain key point. For example, a human posture reference map includes a plurality of candidate points, which are candidate points for the left elbow. For another example, a human posture reference map also includes a plurality of candidate points, which are candidate points for the left knee. Based on the description above, it can be understood that for a frame of image data, if N key points is determined from the frame of image data, N human posture reference maps and N human posture confidence maps exist correspondingly.

The human posture detection model is generated by training a set of a defined number of training samples using the convolutional neural network applicable to the embedded platform. The convolutional neural network applicable to the embedded platform is the lightweight convolutional neural network. The human posture detection model may include a main path, a first branch, a second branch, and a third branch, wherein the main path includes a residual module and an up-sampling module, the first branch includes a refinement network module, and the second branch includes a feedback module; and the residual module includes a first residual unit, a second residual unit, and a third residual unit. For a detailed description of the components of the human posture detection model, a reference is made to the following text.

For that the plurality of human posture reference maps output by a human posture detection model are acquired responsive to inputting the current frame of image data to the human posture detection model with reference to human posture confidence maps of the previous frame of image data, it is divided into the following two cases.

In a first case, the plurality of first human posture reference maps is acquired by inputting the current frame of image data as an input variable into the human posture detection model, and a plurality of human posture confidence maps are output based on a plurality of human posture confidence maps acquired for the previous frame of image data, wherein for each of the first human posture reference maps, one human posture reference map of the current frame of image data is output based on one human posture confidence map among the plurality of human posture confidence maps acquired for the corresponding previous frame of image data. A corresponding relationship as described above is determined based on whether the key points are the same. Illustratively, a first human posture reference map of the current frame of image data is directed to the left elbow, and then its reference is made to the human posture confidence map, in which the corresponding key point is the left elbow, of the previous frame of image data.

It can be understood that for the first case, the human posture confidence maps of the previous frame of image data are not input as the input variables into the human posture detection model together with the current frame of image data. Instead, after the plurality of first human posture reference maps are acquired by inputting the current frame of image data into the human posture detection model, it is determined whether each of the first human posture reference maps is credible sequentially based on the plurality of human posture confidence maps of the previous frame of image data. In a case where the first human posture reference map is credible, the first human posture reference map is taken as the human posture reference map for the current frame; and in a case where the first human posture reference map is incredible, a human posture confidence map of the previous frame of image data corresponding to the first human posture reference map is taken as the human posture reference map for the current frame.

In a second case, the current frame of image data and the human posture confidence maps of the previous frame of image data are taken as input variables and input into the human posture detection model, so as to output the plurality of human posture reference maps.

It can be understood that in the second case described above, the human posture confidence maps of the previous frame of image data are also taken as input variables and input into the human posture detection model together with the current frame of image data. For a video, a certain correlation exists between two adjacent frames of image data. A result of the previous frame of image data is taken as feedback information and input into the human posture detection model for participating in a process of predicting an output result of the current frame of image data, which may improve the prediction accuracy for the human posture detection model.

It should be noted that for the second case, the prediction accuracy of the human posture detection model may be improved by the following method: judging whether the human posture confidence maps of the previous frame of image data are credible; acquiring the plurality of human posture reference maps output by the human posture detection model responsive to inputting, in response to the human posture confidence maps of the previous frame of image data being credible, the current frame of image data and the human posture confidence maps of the previous frame of image data into the human posture detection model; acquiring the plurality of human posture reference maps output by the human posture detection model responsive by inputting, in response to the human posture confidence maps of the previous frame of image data being incredible, the current frame of image data and target image data into the human posture detection model; alternatively, acquiring the plurality of human posture reference maps output by the human posture detection model responsive to inputting, in response to the human posture confidence maps of the previous frame of image data being incredible, the current frame of image data into the human posture detection model. The target image data refers to image data containing no prior knowledge, for example, an all-black image, or an all-zero matrix if represented in the form of a matrix table. For the output result of the current frame of image data, the human posture confidence maps of the previous frame of image data are image data containing the prior knowledge; and for the output result of the next frame of image data, the human posture confidence maps of the current frame of image data are image data containing the prior knowledge.

The reason why the prediction accuracy of the human posture detection model may be improved by the method described above lies in that: if the human posture confidence maps of the previous frame of image data is incredible, it indicates that the human posture confidence maps of the previous frame of image data are not reliable; in such a case, if the human posture confidence maps of the previous frame of image data are still taken as input variables and input into the human posture detection model, the prediction accuracy of the human posture detection model is not improved, and on the contrary, is reduced. Based on the description above, it is necessary to ensure that the human posture confidence maps of the previous frame of image data that are taken as the input variables and input into the human posture detection model are credible. Therefore, it is judged whether the human posture confidence maps of the previous frame of image data are credible before referring to the human posture confidence maps of the previous frame of image data. In a case where the human posture confidence maps of the previous frame of image data are credible, the human posture confidence maps of the previous frame of image data are taken as the input variables and input into the human posture detection model; and on the contrary, in a case where the human posture confidence maps of the previous frame of image data are incredible, the human posture confidence maps of the previous frame of image data are not input as the input variables. Further, whether the human posture confidence maps of the previous frame of image data are credible is judged by the following method: identifying human-posture key points in the human posture reference maps of the previous frame; in response to probability values corresponding to the human-posture key points being greater than a preset threshold, generating mask patterns as the human posture confidence maps of the previous frame by taking the human-posture key points as centers, and determining the human posture confidence maps of the previous frame to be credible; and in response to the probability values corresponding to the human-posture key points being less than or equal to the preset threshold, taking the target image data as the human posture confidence map, and determining the human posture confidence maps of the previous frame to be incredible.

It should be also noted that the plurality of human posture reference maps described above are directed to the output result of the current frame of image data, that is, the current frame of image data corresponds to a plurality of human posture reference maps. Illustratively, if N key points are determined in the current frame of image data, N human posture reference maps are output correspondingly. Meanwhile, there are N human posture confidence maps of the previous frame of image data as a reference.

It should be further noted that for the above description that whether the human posture confidence maps of the previous frame of image data are credible is judged, it refers to judging whether each of the human posture confidence maps of the previous frame of image data is credible, respectively. It may be also understood that the human posture confidence maps may refer to images including key points, with different key points corresponding to different human posture confidence maps, therefore, for different key points, conditions for judging whether the human posture confidence maps are credible may be the same or different, and may be determined according to actual situations, which is not limited here.

In addition, if the current frame of image data is the first frame of image data, that is, there is no previous frame of image data, the current frame of image data is input into the human posture detection model, or the current frame of image data and the target image data are input into the human posture detection model.

In some embodiments, that the plurality of human posture reference maps output by the human posture detection model are acquired responsive to inputting the current frame of image data to the human posture detection model with reference to the human posture confidence maps of the previous frame of image data, includes: judging whether the human posture confidence maps of the previous frame of image data are credible; acquiring the plurality of human posture reference maps output by the human posture detection model responsive to inputting, in response to the human posture confidence maps of the previous frame of image data being credible, the current frame of image data and the human posture confidence maps of the previous frame of image data into the human posture detection model; acquiring the plurality of human posture reference maps output by the human posture detection model responsive by inputting, in response to the human posture confidence maps of the previous frame of image data being incredible, the current frame of image data and target image data into the human posture detection model.

In the embodiments of the present disclosure, the prediction accuracy of the human posture detection model may be improved by considering the following method: judging whether the human posture confidence maps of the previous frame of image data are credible; acquiring the plurality of human posture reference maps output by the human posture detection model responsive to inputting, in response to the human posture confidence maps of the previous frame of image data being credible, the current frame of image data and the human posture confidence maps of the previous frame of image data into the human posture detection model; acquiring the plurality of human posture reference maps output by the human posture detection model responsive by inputting, in response to the human posture confidence maps of the previous frame of image data being incredible, the current frame of image data and target image data into the human posture detection model.

Through the above operation, the human posture confidence maps of the previous frame of image data, which are input as the input variables into the human posture detection model, is guaranteed to be credible, in this way, the prediction accuracy of the human posture detection model for the output result of the current frame of image data is improved based on the prior knowledge provided in the human posture confidence maps of the previous frame of image data.

Illustratively, there are N human posture confidence maps of the previous frame of image data; and whether the N human posture confidence maps are credible is judged respectively, with x human posture confidence maps judged to be credible and (N–x) human posture confidence maps judged to be not incredible. Then, the x credible posture confidence maps, (n–x) target image data and the current frame of image data may be input into the human posture detection model, so as to output a plurality of human posture reference maps.

In some embodiments, prior to acquiring the plurality of human posture reference maps output by the human posture detection model responsive to inputting the current frame of image data to the human posture detection model with reference to human posture confidence maps of a previous frame of image data, the method includes: pre-processing each frame of image data respectively to acquire processed image data.

In the embodiments of the present disclosure, pre-processing may include normalization and whitening, wherein the normalization refers to converting an original image to be processed into a corresponding unique standard form through a series of transformations, i.e., finding, by using invariant moments of the image, a set of parameters that are enable to eliminate the effects of other transformation functions on the image transformation. The image in the standard form shows invariant characteristics to affine transformations such as translation, rotation or scaling. Typically, the normalization includes the following steps: coordinate centering, x-shearing normalization, scaling normalization, and rotation normalization. Before the current frame of image data is input into the human posture detection model, the human posture detection model is generated by training using a neural network. The normalization of the image data plays a role of generalizing and unifying the statistical distribution of samples, thereby increasing the speed of network learning and ensuring that small values in the output data are not swallowed.

Due to the strong correlation between adjacent pixels in the image data, the image data is redundancy when input as the input variables. The whitening plays a role of reducing the redundancy during the input. More precisely, the input variables achieve the following characteristics through the whitening: low correlation between features; and identical variance for all the features, wherein the variance is typically set to unit variance in image processing.

It can be understood that after the image data is pre-processed, the current frame of image data input as the input variable into the human posture detection model is processed image data. Without doubt, the previous frame of image data is also processed image data.

In step 130, a human-posture key point is identified in each of the human posture reference maps.

In the embodiments of the present disclosure, according to the previous description, it can be seen that the human posture reference map includes the position information of each point that may act as the human-posture key point and a probability value corresponding to the position information, wherein the human-posture key point is a point determined as the key point, that is to say, the human-posture key point is the key point. Meanwhile, the points that may act as the human-posture key point are referred to as candidate points.

Based on the above description, it can be understood that each of the human posture reference maps includes the position information of a plurality of candidate points and the probability values corresponding to the position information, and which candidate point is taken as the human-posture key point may be determined based on the probability values corresponding to the position information of the plurality of candidate points. Illustratively, a candidate point corresponding to a largest probability value among the probability values corresponding to the position information of the plurality of candidate points is selected as the human-posture key point.

In some embodiments, each of the human posture reference maps includes a plurality of candidate points for the human-posture key point, and a coordinate position of each of the candidate points corresponds to one probability value; and that the human-posture key point is identified in each of the human posture reference maps includes: determining a coordinate position corresponding to a maximum probability value among the plurality of probability values, and taking a candidate point corresponding to the coordinate position as the human-posture key point.

In the embodiments of the present disclosure, since each of the human posture reference maps includes the position information of a plurality of points that may act as the human-posture key points, and the probability values corresponding to the position information, which point is taken as the human-posture key point may be determined based on the probability values corresponding to the position information of the plurality of points. Illustratively, the coordinate position of the largest probability value is determined in the human posture reference maps, and is taken as the human-posture key point.

It should be noted that each human posture reference map has only one human-posture key point. In a case where the human-posture key points are determined based on the probability values as described above, there may be the following situation: among the human posture reference maps, there are at least two equal probability values that are both greater than other probability values. Then, that the coordinate position of which probability value is taken as the human-posture key point is determined according to actual situations, for example, whether the joint connection is reasonable. Illustratively, two equal probability values that are both greater than other probability values exist among the human posture reference maps, and have the coordinate positions A and B respectively, and then whether joint connection is performed by taking A and B as the human-posture key points respectively is reasonable is judged, with a result as follows: the joint connection is unreasonable by taking A as the human-posture key point; and the joint connection is reasonable by taking B as the human-posture key point. Therefore, B is determined as the human-posture key point.

In step 140, human posture confidence maps of the current frame of image data are generated based on credibility of the human-posture key points, wherein the human posture confidence maps of the current frame of image data is configured to participate in generation of human posture confidence maps of a next frame of image data.

In the embodiments of the present disclosure, the credibility may include credibility and incredibility, and a criterion for determining the credibility and incredibility may be as follows: whether a probability value corresponding to a human-posture key point is greater than a preset threshold. That is, in a case where a probability value corresponding to a human-posture key point is greater than the preset threshold, it may indicate that the human-posture key point is credible; and in a case where a probability value corresponding to a human-posture key point is less than or equal to the preset threshold, it may indicate that the human-posture key point is incredible.

Based on this, in the case where the human-posture key points are credible, mask patterns having the human-posture key points as centers are generated as the human posture confidence maps; and in the case where the human-posture key points are incredible, the target image data may be taken as the human posture confidence maps. The target image data described here is the same as the target image data described earlier. The target image data may be an all-black image, and may be an all-zero matrix when being represented in a form of matrix table. Whether the human-posture key points are credible may be judged by the following method: judging whether the probability values of the human-posture key points are greater than a preset threshold; determining, in response to a probability value of a human-posture key point being greater than a preset threshold, the human-posture key point is credible; and determining, in response to a probability value of the human-posture key point is less than or equal to a preset threshold, that the human-posture key point is incredible.

It should be noted that in the case where the human-posture key points are determined to be incredible, the human-posture key points corresponding to the previous frame of image data may be taken as the human-posture key points of the current frame; however, for the incredible human-posture key points, their human posture confidence maps are not generated based on the corresponding human-posture key points in the previous frame of image data, rather are generated based on the human posture confidence maps of the target image data.

In some embodiments, that the human posture confidence maps are generated based on the credibility of the human-posture key points includes: judging whether the human-posture key points are credible; generating, in response to the human-posture key points being credible, mask patterns with the human-posture key points as centers, and taking the mask patterns as the human posture confidence maps; taking, in response to the human-posture key points being incredible, the target image data as the human posture confidence maps.

In the embodiments of the present disclosure, the mask pattern refers to a pattern acquired by performing image masking on an image. The image masking refers to controlling an image processing region or processing process by shielding (fully or partially) an image to be processed by using a selected image, graph or object. The specific image or object used for coverage is called as a mask or template. In digital image processing, the mask may be a two-dimensional matrix array or a multi-value image. The image masking is configured to: first, extract a region of interest, that is, the pre-made mask of the region of interest is multiplied by an image to be processed to obtain an image of the region of interest, wherein image values in the region of interest remain unchanged, and image values outside the region are zero; second, play a role of shielding; that is, certain regions on the image to be processed are shielded by using the mask, such that said regions are not involved in the processing and the computation of processing parameters, or only the masked regions are processed and counted; third, extract structure features; that is, the structural features of the image to be processed, similar to the mask, are detected and extracted by using a similarity template or an image matching method; and fourth, produce an image with a special shape, That the human posture confidence map is generated from the human posture reference map based on the credibility of the human-posture key point includes: generating, in response to the human posture key-point being credible, a mask pattern having the human-posture key point as a center as the human posture confidence map. Illustratively, in the case where the human-posture key point is credible, a mask pattern having the human-posture key point as a center is generated as the human posture confidence map by a Gaussian kernel. It should be noted that a region affected by the mask pattern may be determined by setting parameters of the Gaussian kernel, wherein the parameters of the Gaussian kernel include the width and height of a filtering window, and the Gaussian kernel may be a two-dimensional Gaussian kernel. For example, a certain Gaussian kernel is the two-dimensional Gaussian kernel, and then, the parameters of the two-dimensional Gaussian kernel are as follows: the filtering window has a width of 7 and a height of 7. That is, the region affected by the mask pattern is a square region of 7×7.

It should be noted that in the case where the human-posture key points are incredible, the target image data may be taken as the human posture confidence maps, or may be considered as a mask pattern. The target image data described here is the same as the target image data described earlier. The target image data may be an all-black image, and may be an all-zero matrix when being represented in a form of matrix table.

In some embodiments, that whether the human-posture key points are credible is judged includes: judging whether the probability values corresponding to the human-posture key points are greater than a preset threshold; determining, in response to the probability values corresponding to the human-posture key points being greater than the preset threshold value, that the human-posture key points are credible; and determining, in response to the probability values corresponding to the human-posture key points being less than or equal to the preset threshold value, that the human-posture key points are incredible.

In the embodiments of the present disclosure, it should be noted that the threshold value may be set according to actual situations, which is not limited here. In addition, the thresholds corresponding to different human-posture key points may be the same or different, or may be determined according to actual situations, which is not limited here. For example, for important human-posture key points, a larger threshold may be set; and for unimportant human-posture key points, a smaller threshold may be set. Illustratively, in a case where a human-posture key point is the top of the head, a corresponding threshold is 0.9, and in a case where a human-posture key point is the left knee, a corresponding threshold is 0.5.

In step 150, whether the current frame of image data is a last frame of image is judged; step 160 is executed in a case where the current frame of image data is not the last frame of image data; and step 170 is executed in a case where the current frame of image data is the last frame of image data.

In step 160, the human posture confidence maps of the current frame of image data are input into the human posture detection model for participating in generation of human posture confidence maps of a next frame of image data.

In step 170, the generation of human posture confidence maps of the plurality of frames of image data is terminated.

In an embodiment of the present disclosure, whether the current frame of image data is the last frame of image data is judged. In the case where the current frame of image data is not the last frame of image data, the human posture confidence maps of the current frame of image data may be input to the human posture detection model as a reference for an output result of the next frame of image data, so as to improve the accuracy of the output result of the next frame of image data. That is, a plurality of human posture reference maps of the next frame of image data output by the human posture detection model are acquired responsive to inputting the next frame of image data input to the human posture detection model with reference to the human posture confidence maps of the current frame of image data; a human-posture key point is identified in each of the human posture reference maps; and a human posture confidence map is generated based on the credibility of each of the human-posture key points.

It should be noted that in the case where the current frame of image data is the last frame of image data, it indicates that the generation of human posture confidence maps of the plurality of frames of image data may be terminated, without inputting the acquired human posture confidence maps into the human posture detection model. Based on this, it can be understood that in the case where the current frame of image data is the last frame of image data, only steps 120 and 130 may be executed, and whether the human-posture key points are credible is judged; if the human-posture key points are incredible, the human-posture key points corresponding to the previous frame of image data are taken as the human-posture key points. Without doubt, it can be understood that the human-posture key point corresponding to the current frame of image data may be acquired once steps 120 and 130 are executed, and whether the human-posture key points are credible is judged, and if the human-posture key points are incredible, the human-posture key points corresponding to the previous frame of image data are taken as the human-posture key points.

It should be also noted that steps 120 to 150 are all processing procedures for the current frame of image data. Accordingly, the human posture reference maps in step 120 and step 130 refer to the human posture reference maps corresponding to the current frame of image data; the human-posture key points in steps 130 and 140 refer to the human-posture key points corresponding to the current frame of image data; and the human posture confidence maps in steps 140 and 150 refers to the human posture confidence maps corresponding to the current frame of image data.

Based on the above description, the current frame of image data represents a certain frame of image data being processed currently, therefore, in a case where a first frame of image data is a certain frame of image data being processed currently, the first frame of image data may be taken as the current frame of image data; and in a case where a second frame of image data is a certain frame of image data being processed currently, the second frame of image data may be taken as the current frame of image data, and so forth. That is to say, the current frame of image data may be the first frame of image data, the second frame of image data, the third frame of image data, . . . , the (N−1)$^{th}$ frame of image data, or the Nth frame of image data.

It is assumed that a video includes N frames of image data, with N≥1. In a case where the current frame of image data is not determined to be the N$^{th}$ frame of image data, steps 120-140 may be repeated to complete an operation of processing the first frame of image data to the (N−1)$^{th}$ frame of image data; in a case where the current frame of image data is determined to be the N$^{th}$ frame of image data, steps 120 to 130 may be executed, and the corresponding human-posture key points in the previous frame of image data may be taken as the human-posture key points in a case where the human-posture key points are not credible.

According to a technical solution of this embodiment, a plurality of frames of image data are acquired; a plurality of human posture reference maps output by a human posture detection model are acquired responsive to inputting a current frame of image data to the human posture detection model with reference to human posture confidence maps of a previous frame of image data, wherein the human posture detection model is generated by training using a convolutional neutral network applicable to an embedded platform; human-posture key points in the human posture reference maps are identified; human posture confidence maps of the current frame of image data are generated based on credibility of the human-posture key points; whether the current frame of image data is a last frame of image data is judged; in a case where the current frame of image data is not the last frame of image data, the human posture confidence maps of the current frame of image data are input into the human posture detection model for participating in the generation of human posture confidence maps of a next frame of image data; and in a case where the current frame of image data is the last frame of image data, the generation of human posture confidence maps of the plurality of frames of image data is terminated. Through the method described above, the human posture detection can be implemented on the embedded platform. Meanwhile, an output result of the previous frame image data is introduced in a process of predicting an output result of the current frame of image data, which improves the prediction accuracy.

In some embodiments, the human posture detection model includes a main path, a first branch, and a second branch, wherein the main path includes a residual module and an up-sampling module, the first branch includes a refinement network module, and the second branch includes a feedback module.

As for that the plurality of human posture reference maps output by a human posture detection model are acquired responsive to inputting a current frame of image data to the human posture detection model with reference to human posture confidence maps of a previous frame of image data, it includes: acquiring a first convolution result by inputting the current frame of image data into the residual module for processing and further processing the processed current frame of image data with reference to a result acquired by inputting the human posture confidence maps of the previous image data into the feedback module and processing the human posture confidence maps therein; acquiring a second convolution result by inputting the first convolution result output by the residual module into the up-sampling module and processing the first convolution result therein, and acquiring a third convolution result by inputting the first convolution result output by the residual module into the refinement network module and processing the first convolution result therein; and acquiring the plurality of human posture reference maps by adding up the second convolution result and the third convolution result.

As for that the first convolution result is acquired by inputting the current frame of image data into the residual module for processing and further processing the processed current frame of image data with reference to the result acquired by inputting the human posture confidence maps of the previous image data into the feedback module and processing the human posture confidence maps therein, it means that: the first convolution result output by the residual module is acquired based on a processing result of the residual module on the current frame of image data and a processing result of the feedback module on the human posture confidence maps of the previous image data.

In the embodiments of the present disclosure, the residual module is configured to extract features such as edge and contour of the image data, and the up-sampling module is configured to extract context information of the image data. The refinement network module is configured to process the first convolution result output by the residual module, wherein the first convolution result may be regarded as information of network intermediate layers. That is, the refinement network module makes use of the information of network intermediate layers to increase its return gradient, thereby improving the prediction accuracy of the convolutional neural network. The feedback module is configured to introduce the human posture confidence maps of the previous frame of image data into the convolutional neural network to improve the accuracy of the output result of the current frame of image data.

As for that the current frame of image data is input into the residual module for processing, and the human body posture confidence maps of the previous frame of image data are input into the feedback module for processing to acquire the first convolution result, it may be understood as follows: the first convolution result is acquired by inputting the current frame of image data into the residual module for processing and further processing the processed current frame of image data with reference to the result acquired by inputting the human posture confidence maps of the previous image data into the feedback module and processing the human posture confidence maps therein.

A second convolution result is acquired by inputting the first convolution result output by the residual module into the up-sampling module and processing the first convolution result therein, a third convolution result is acquired by inputting the first convolution result output by the residual module into the refinement network module and processing the first convolution result therein, and then, the plurality of human posture reference maps are acquired by adding up the second convolution result and the third convolution result, wherein the up-sampling module may perform up-sampling by using a nearest neighbor interpolation method or other up-sampling methods, which may be set according to actual situations, and is not limited here.

Via the refinement network module, the information of network intermediate layers is used, and the return gradient is increased, thereby improving the prediction accuracy of the convolutional neural network. The predication accuracy of the convolutional neural network is also improved through introducing, by the feedback module, the human posture confidence maps of the previous frame of image data into the convolutional neural network for participating in the predication of the current frame of image data by the human posture detection model.

In some embodiments, the residual module includes a first residual unit, a second residual unit, and a third residual unit.

As for that the first convolution result output by the residual module is acquired based on the processing result of the residual module on the current frame of image data and the processing result of the feedback module on the human posture confidence maps of the previous image data, it includes: acquiring a first intermediate result by inputting the current frame image data into the first residual unit and processing the current frame image data therein; inputting the human posture confidence maps of the previous image data into the feedback module and processing the human posture confidence maps of the previous image data therein; acquiring an addition result by adding up the first intermediate result and a processing result output by the feedback module; acquiring a second intermediate result by inputting the addition result into the second residual unit and processing the addition result therein; and acquiring a third intermediate result by inputting the second intermediate result into the third residual unit and processing the second intermediate result therein, and taking the third intermediate result as the first convolution result. The numbers of channels for the first intermediate result, the second intermediate result, and the third intermediate result are increased successively.

In the embodiments of the present disclosure, the residual module includes a first residual unit, a second residual unit, and a third residual unit, wherein each residual unit is composed of a ShuffleNet subunit and a ShuffleNet down-sampling subunit. The ShuffleNet subunit may operate on image data of any size, and is controlled by two parameters, i.e., an input depth and an output depth respectively, wherein the input depth represents a number of network intermediate feature layer for input; the output depth refers to a number of intermediate feature layers output by the subunit; and the number of layers corresponds to the number of channels. The ShuffleNet subunit extracts high levels of features while retaining the information of an original level, such that only the depth of the network intermediate feature layers is changed without changing the size of the image data. The ShuffleNet subunit may be regarded as an advanced "convolutional layer" that keeps the size unchanged. In the convolutional neural network, the number of channels refers to the number of convolution kernels in each convolution layer. In addition, it should be noted that each residual unit may include only one ShuffleNet subunit. Compared with the original residual unit including three ShuffleNet subunits, a network structure is simplified, and accordingly, the amount of computation is reduced and the processing efficiency is increased.

Through the successive processing by the ShuffleNet down-sampling subunits in the first residual unit, the second residual unit and the third residual unit, the sizes of the first intermediate result, the second intermediate result and the third intermediate result are successively reduced; and meanwhile, to keep the size of the network unchanged, the number of channels for the first intermediate result, the number of channels for the second intermediate result, and the number of channels for the third intermediate result are increased successively. In addition, each channel corresponds to a feature map.

It should be noted that the intermediate result may be represented by W×H×K, wherein W represents the width of the intermediate result, H represents the length of the intermediate result, K represents the number of channels, and W×H represents the size of the intermediate result. For the input image data, it may be represented as W×H×D, wherein W and H have the same meaning as described above, and D represents the depth. Illustratively, in a case where the input image data is an RGB image, D=3; and in a case where the input image data is a grayscale image, D=1.

Illustratively, the first intermediate result, the second intermediate result, and the third intermediate result are represented by W×H×K, with the meanings of W, H, and K the same as described above. Then the first intermediate result is 64×32×32, the second intermediate result is 32×16×64, and the third intermediate result is 16×8×128. Based on the above description, it can be seen that the size of the first intermediate result is 64×32, the size of the second intermediate result is 32×16, and the size of the third intermediate result is 16×8. The above shows that the first intermediate result, the second intermediate result and the third intermediate result decrease successively in size. Meanwhile, the number of channels for the first intermediate result is 32, the number of channels for the second intermediate result is 64, and the number of channels for the third intermediate result is 128. The above shows that the first intermediate result, the second intermediate result and the third intermediate result increase successively in the number of channels.

In some embodiments, the human posture detection model includes a third branch.

As for that the second convolution result is acquired by inputting the first convolution result output by the residual module into the up-sampling module and processing the first convolution result therein, it includes: a fourth intermediate result is acquired by inputting the first intermediate result into the third branch and processing the first intermediate result therein; a fifth intermediate result is acquired by inputting the second intermediate result into the third branch and processing the second intermediate result therein; a sixth intermediate result is acquired by inputting the third intermediate result and the fifth intermediate result into the up-sampling module and processing the third intermediate result and the fifth intermediate result therein; a seventh intermediate result as the second convolution result is acquired by inputting the fourth intermediate result and the sixth intermediate result into the up-sampling module and processing the fourth intermediate result and the sixth intermediate result therein. The numbers of channels for the sixth intermediate result and the seventh intermediate result are decreased successively.

In some embodiments of the present disclosure, the human posture detection model includes a third branch, which plays a role of transferring a convolution operation of jump connection to the main path, thereby improving the prediction accuracy of the human posture detection model. The third branch includes a 1×1 convolution kernel module, a batch standardizing module and a linear activation function module. The 1×1 convolution kernel may play the following roles:

in a first case, for a single channel and a single convolution kernel, the 1×1 convolution kernel scales the input image data. This is because the 1×1 convolution kernel has only one parameter, and slides on the input image data, which is equivalent to multiplying the input image data by a coefficient; and in a second case, for multiple channels and multiple convolution kernels, the 1×1 convolution kernel plays the following roles in two aspects: first, implementing cross-channel interaction and information integration; second, reducing and raising a dimension and reducing network parameters, wherein said reducing the dimension here refers to reducing the number of channels, and said raising the dimension refers to increasing the number of channels; and third, increasing nonlinear characteristics significantly without the loss of resolution.

The batch standardizing module is configured to perform batch standardization, wherein the batch standardization (or batch normalization) is to avoid gradient vanishment or gradient explosion due to the deepening of neural network layers and the decrease of convergence speed; and the input for some or all layers may be normalized through the batch standardization to fix a mean and variance of an input signal of each layer, such that the input in each layer has a stable distribution. Illustratively, the batch standardization is generally used before the activation function to normalize $x=W+B$, such that the output results have a mean value of 0 and a variance of 1, wherein W represents a weight matrix and b represents an offset. It can be understood that in the convolutional neural network, the weight matrix refers to the convolution kernel, that is, W represents the convolution kernel.

Since the seventh intermediate result is acquired after inputting the sixth intermediate result and the fourth intermediate result into the up-sampling module, the size of the seventh intermediate result is greater than the size of the sixth intermediate result. Meanwhile, to keep a network size unchanged, the number of channels for the sixth intermediate result and the number of channels for the seventh intermediate result is decreased successively.

The prediction accuracy of the human posture detection model is improved by transferring a convolution operation of jump connection to the main path via the third branch. In addition, the first intermediate result, the second intermediate result, and the third intermediate result may be understood as an encoding section, and the sixth intermediate result and the seventh intermediate result may be understood as a decoding section. To keep the network size unchanged, in the encoding part, the numbers of channels for the intermediate results is increased successively along with the decrease in the sizes of the intermediate results; and in the decoding section, the numbers of channels for the intermediate results is decreased successively along with the increase in the sizes of the intermediate results. In addition, it can be understood that the convolutional neural network according to the embodiments of the present disclosure is an asymmetric encoding-decoding structure.

In some embodiments, after the plurality of human posture reference maps are acquired by adding up the second convolution result and the third convolution result, the method further includes: acquiring a target result by adding up the first convolution result and the second convolution result; and acquiring the plurality of human posture reference maps by adding up the plurality of human posture reference maps and the target result. The target result is intended to improve the accuracy of the human posture detection model when the human posture detection model is trained.

In some embodiments of the present disclosure, in order to improve the accuracy of the human posture detection model in a training phase, the addition of midway supervision may be considered, wherein the midway supervision refers to computing a loss of an output in each stage, which may ensure the normal update of underlying parameters.

A target result is acquired by adding up the first convolution result and the second convolution result; and then the plurality of human posture reference maps are acquired by adding up the target result and a plurality of human posture reference maps. The above target result plays a role of the midway supervision, that is, the target result is also involved in a process of computing the loss.

It should be noted that in a prediction stage, the operation of adding up the first convolution result and the second convolution result may not be executed, that is, an output result in the prediction stage only includes the plurality of human posture reference maps.

It should be also noted that in a technical solution according to the embodiments of the present disclosure, after a plurality of frames of image data are acquired, it is unnecessary to perform operations such as detecting whether a face exists in the image data, and detecting and extracting a position of the face in the image data in a case where the face exists. The reason for not performing the above operations lies in that the above operations take a long time with a large error in a detection result. It can be understood that the data processing efficiency can be greatly improved without performing the above operations.

It should be additionally noted that, since the second residual unit and the third residual unit are each composed of a ShuffleNet subunit and a ShuffleNet down-sampling subunit, the information on original size is retained on the main path before each down-sampling. That is, before the ShuffleNet down-sampling sub-unit of the second residual unit performs down-sampling, the first intermediate result is input into the second residual unit; and before the ShuffleNet down-sampling sub-unit of the third residual unit performs down-sampling, the second intermediate result is input into the third residual unit. One ShuffleNet subunit is used between the two down-samplings to extract features. That is, one ShuffleNet subunit is used between the first residual unit and the second residual unit to extract the features, and said ShuffleNet subunit is the ShuffleNet subunit of the first residual unit. One ShuffleNet subunit is used between the second residual unit and the third residual unit to extract features. That is, one ShuffleNet subunit is used between the second residual unit and the third residual unit to extract the features, and said ShuffleNet subunit is the ShuffleNet subunit of the second residual unit.

The convolutional neural network according to the embodiments of the present disclosure introduces the refinement network module, the feedback module, and the transferring of the convolution operation of jump connection to the main path, thereby improving the prediction accuracy of the convolutional neural network. In addition, the use of the asymmetric encoding-decoding structure ensures that the network size is basically unchanged. Since each residual unit includes only one ShuffleNet subunit, a network structure is simplified compared with the original residual unit including three ShuffleNet subunits. Accordingly, the amount of computation is reduced, and the processing efficiency is increased. Based on the above description, the method for detecting a human posture based on a convolutional neural network is consequently applicable to an embedded platform, such as an embedded platform of a smart phone, and runs in real time with the prediction accuracy meeting the requirements.

In order to better understand the convolutional neural network according to the embodiments of the present disclosure, the explanation is made below with reference to specific examples.

Figure 2:
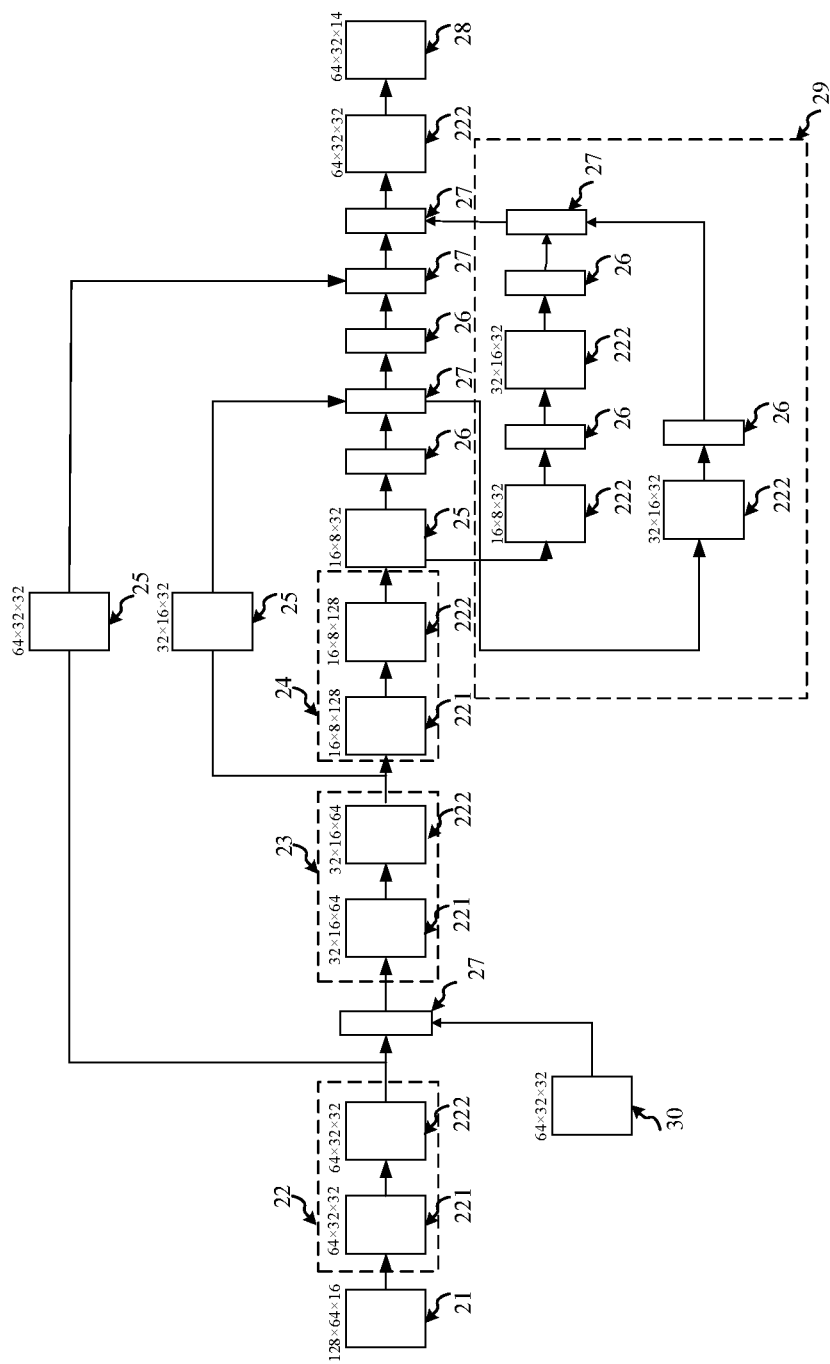
FIG. 2 is a schematic diagram showing the application of a convolutional neural network according to an embodiment of the present disclosure.

As shown in FIG. 2, a schematic diagram showing the application of a convolutional neural network is provided. The convolutional neural network may include: a main path, a first branch, a second branch, and a third branch. The main path includes a first convoluting module 21, a first residual unit 22, a second residual unit 23, a third residual unit 24, a second convoluting module 25, an up-sampling module 26, and an add-with-carry module 27 and a third convoluting module 28.

The first residual unit 22, the second residual unit 23, and the third residual unit 24 each include a ShuffleNet down-sampling subunit 221 and a ShuffleNet sub-unit 222. The first branch includes a refinement network module 29, wherein the refinement network module 29 includes a ShuffleNet subunit 222, an up-sampling module 26, and an add-with-carry module 27; the second branch includes a feedback module 30; and the third branch includes a second convoluting module 25.

It should be noted that W×H×K as marked on the module, unit or sub-unit represents a result acquired after the processing by the module, unit or sub-unit, wherein W represents the width for the result, H represents the length for the result, and K represents the number of channels.

It should be also noted that the first convoluting module 21 includes the following processing operations: a first step, a convolution operation, wherein the size of a convolution kernel used is 3×3; a second step, batch standardization; and a third step, a linear activation function. The second convoluting module 25 includes the following processing operations: a first step, a convolution operation, wherein the size of a convolution kernel used is 1×1; a second step, batch standardization; and a third step, a linear activation function. The third convoluting module 26 includes the following processing operations: a first step, a convolution operation, wherein the size of a convolution kernel used is 1×1; a second step, batch normalization; a third step, a linear activation function; and a fourth step, a convolution operation, wherein the size of a convolution kernel used is 3×3.

It is assumed that the current frame of image data is an RGB image of 256×128×3, the current frame of image data is input as an input variable into the convolutional neural network, and then processed successively by the first convoluting module 21 and the first residual unit 22 to acquire a first intermediate result, which is 64×32×32; the first intermediate result and results acquired by inputting the human posture confidence maps of the previous frame of image data into the feedback module 30 and processing the human posture confidence maps therein are then jointly input into the add-with-carry module 27 on the main path and processed therein; results acquired after the processing by the add-with-carry module 27 on the main path are input into the second residual unit 23 and processed therein to acquire a second intermediate result, which is 32×16×64; the second intermediate result is input into the third residual unit 24 and processed therein to acquire a third intermediate result; and the third intermediate result is taken as a first convolution result, which is 16×8×128. It should be noted that the feedback module 30 may include a 1×1 convolution kernel, which is configured to raise a dimension. This is because the human posture confidence maps of the previous frame of image data are 64×32×14, and the first intermediate result is 64×32×32, the dimension needs to be raised to ensure that the two are same in the number of output channels.

The first intermediate result is input into the second convoluting module 25 on the third branch and processed therein to acquire a fourth intermediate result, which is 64×32×32.

The second intermediate result is input into the second convoluting module 25 on the third branch and processed therein to acquire a fifth intermediate result, which is 32×16×32.

A result acquired by inputting the third intermediate result into the second convoluting module 25 and the up-sampling module 26 on the main path for processing and the fifth intermediate result are jointly input into the add-with-carry module 27 on the main path and processed therein to acquire a sixth intermediate result. A result acquired by inputting the sixth intermediate result into the up-sampling module 26 on the main path and processing the sixth intermediate result therein and the fourth intermediate result are jointly input into the add-with-carry module 27 on the main path and processed therein to acquire a seventh intermediate result. The seventh intermediate result is taken as a second convolution result, which is 64×32×32.

The third intermediate result is input into the second convoluting module 25 on the main path and processed therein to acquire a result; the result is then input into the ShuffleNet sub-unit 222 on the first branch and processed therein to acquire an eighth intermediate result; the eighth intermediate result is input into the up-sampling module 26 on the first branch and processed therein to acquire a ninth intermediate result; the ninth intermediate result is then input into the ShuffleNet subunit 222 on the first branch and processed therein to acquire a tenth intermediate result; and the tenth intermediate result is input into the up-sampling module 26 on the first branch and processed therein to acquire the eleventh intermediate result. The sixth intermediate result is input into the ShuffleNet subunit 222 on the first branch and processed therein to acquire a twelfth intermediate result; the twelfth intermediate result is input into the up-sampling module 26 on the first branch and processed therein to acquire a thirteenth intermediate result; the eleventh intermediate result and the thirteenth intermediate result are jointly input into the add-with-carry module 27 on the first branch and processed therein to acquire a third convolution result, which is 64×32×32.

The second convolution result and the third convolution result are input into the add-with-carry module 27 on the main path to acquire a fourteenth intermediate result; the fourteenth intermediate result is input into the ShuffleNet subunit 222 on the main path to acquire a fifteenth intermediate result, which is 64×32×32; the fifteenth intermediate result is input into the third convoluting module 28 on the main path; and a plurality of human posture reference maps are acquired.

The first convolution result and the second convolution result are added up to acquire a target result, which is 64×32×14. The plurality of human posture reference maps and the target result are added up, and the plurality of new human posture reference maps are output. The target result is intended to improve the accuracy of the human posture detection model when the human posture detection model is trained.

It should be noted that the human posture confidence maps of the previous frame of image data are not input as input variables into the convolutional neural network together with the current frame of image data at the beginning, but are input as input variables into the convolutional neural network together with the first intermediate result in network intermediate layers. In such way, the load of data processing is reduced.

Figure 3:
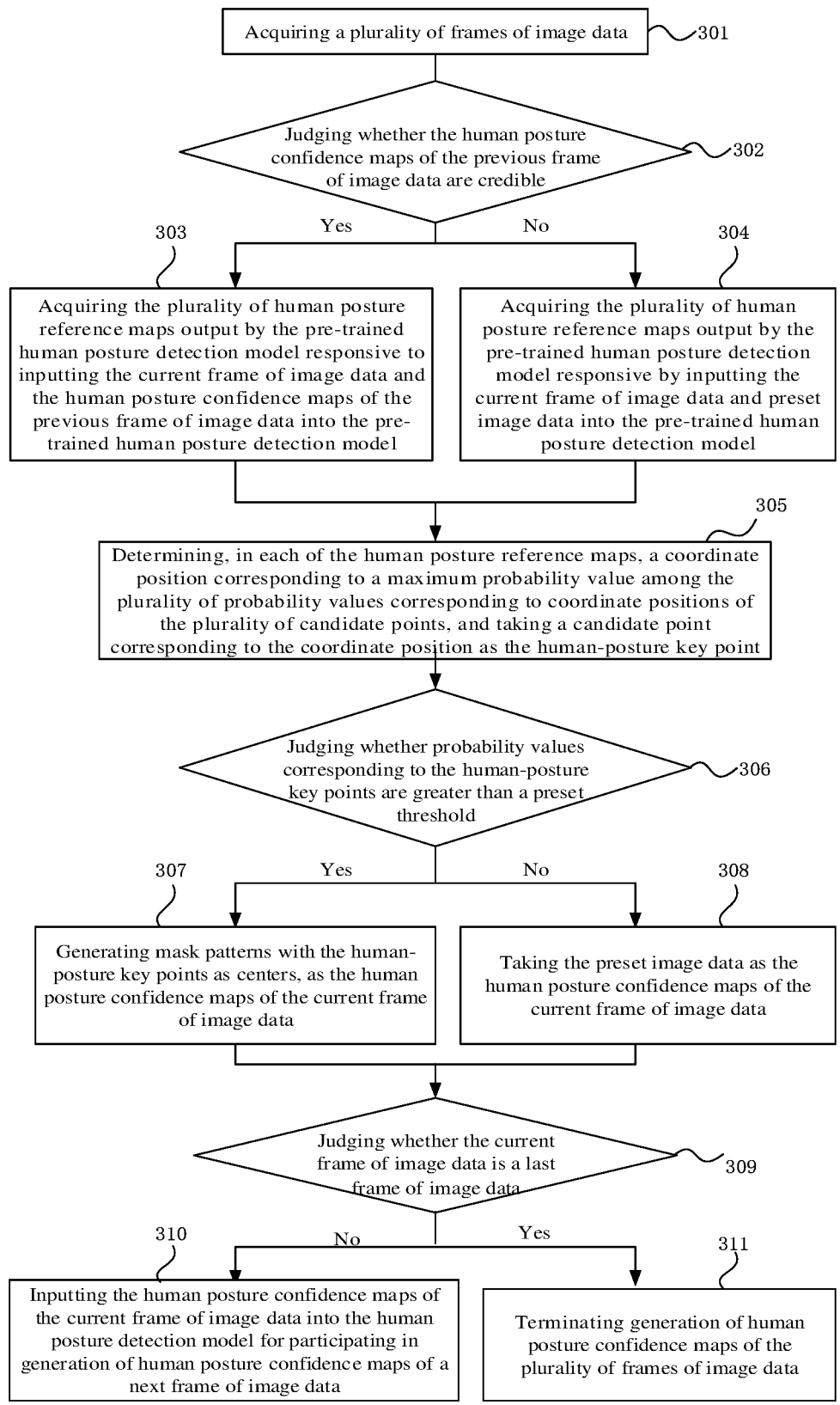
FIG. 3 is a flowchart showing another human posture detection method according to an embodiment of the present disclosure.

FIG. 3 is a flowchart showing another human posture detection method according to an embodiment of the present disclosure. This embodiment is applicable to the human posture detection. The method may be executed by a human posture detection apparatus. The apparatus is implemented in software and/or hardware. The apparatus may be configured in a device, for example, typically, a computer or a mobile terminal. As shown in FIG. 3, the method includes steps 301 to 311.

In step 301, a plurality of frames of image data is acquired.

In step 302, whether the human posture confidence maps of the previous frame of image data are credible is judged; in a case where the human posture confidence maps of the previous frame of image data are credible, step 303 is executed; and in a case where the human posture confidence maps of the previous frame of image data are incredible, step 304 is executed.

In step 303, the plurality of human posture reference maps are acquired by inputting the current frame of image data and the human posture confidence maps of the previous frame of image data into the human posture detection model; and then step 305 is executed in turn.

In step 304, the plurality of human posture reference maps are acquired by inputting the current frame of image data and the target image data into the human posture detection model; and then step 305 is executed in turn.

In step 305, each of the human posture reference maps includes a plurality of candidate points for the human-posture key point, and a coordinate position of each of the candidate points corresponds to one probability value; and a coordinate position corresponding to a maximum probability value among the plurality of probability values corresponding to coordinate positions of the plurality of candidate points is determined in each of the human posture reference maps, and a candidate point corresponding to the coordinate position is taken as the human-posture key point.

In step 306, whether probability values corresponding to the human-posture key points are greater than a preset threshold is judged; in a case where the probability values corresponding to the human-posture key points are greater than the preset threshold, step 307 is executed; and in a case where the probability values corresponding to the human-posture key points are less than or equal to the preset threshold, step 308 is executed.

In step 307, mask patterns with the human-posture key points as centers are generated as the human posture confidence maps of the current frame of image data; and then step 309 is executed in turn.

In step 308, the target image data is taken as the human posture confidence maps of the current frame of image data; and then step 309 is executed in turn.

In step 309, whether the current frame of image data is a last frame of image is judged; step 310 is executed in a case where the current frame of image data is not the last frame of image data; and step 311 is executed in a case where the current frame of image data is the last frame of image data.

In step 310, the human posture confidence maps of the current frame of image data are input into the human posture detection model for participating in generation of human posture confidence maps of a next frame of image data.

In step 311, the generation of human posture confidence maps of the plurality of frames of image data is terminated.

In the embodiments of the present disclosure, it should be noted that the human posture detection model according to the embodiments of the present disclosure is generated through training by a convolutional neural network applied to an embedded platform.

According to a technical solution of this embodiment, by acquiring a plurality of frames of image data, a plurality of human posture reference maps output by a human posture detection model are acquired responsive to inputting a current frame of image data to the human posture detection model with reference to human posture confidence maps of a previous frame of image data, wherein the human posture detection model is generated by training using a convolutional neutral network applicable to an embedded platform; human-posture key points in the human posture reference maps are identified; human posture confidence maps of the current frame of image data are generated based on credibility of the human-posture key points; whether the current frame of image data is a last frame of image data is judged; in a case where the current frame of image data is not the last frame of image data, the human posture confidence maps of the current frame of image data are input into the human posture detection model for participating in generation of human posture confidence maps of a next frame of image data; and in a case where the current frame of image data is the last frame of image data, the generation of human posture confidence maps of the plurality of frames of image data is terminated, thereby implementing the human posture detection on the embedded platform. Meanwhile, an output result of the previous frame image data is introduced in a process of predicting an output result of the current frame of image data, which improves the prediction accuracy.

Figure 4:
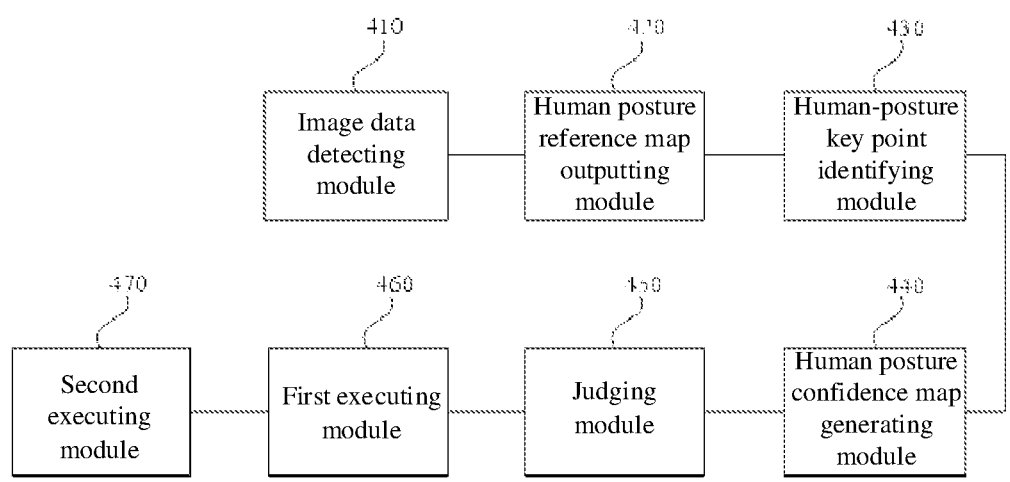
FIG. 4 is a schematic structural diagram of a human posture detection apparatus according to an embodiment of the present disclosure.

FIG. 4 is a schematic structural diagram of a human posture detection apparatus according to an embodiment of the present disclosure. This embodiment is applicable to a human posture detection. The apparatus may be implemented as software and/or hardware, and may be disposed in a device, for example, typically, a computer or a mobile terminal. As shown in FIG. 4, the apparatus includes an image data acquiring module 410, a human posture reference map outputting module 420, a human-posture key point identifying module 430, a human posture confidence map generating module 440, a judging module 450, a first executing module 460, and a second executing module 470.

The image data acquiring module 410 is configured to acquire a plurality of frames of image data.

The human posture reference map outputting module 420 is configured to acquire a plurality of human posture reference maps output by a human posture detection model responsive to inputting a current frame of image data into the human posture detection model with reference to human posture confidence maps of a previous frame of image data, wherein different human posture reference maps correspond different human-posture key points.

The human-posture key point identifying module 430 is configured to identify a human-posture key point in each of the human posture reference maps.

The human posture confidence map generating module 440 is configured to generate human posture confidence maps of the current frame of image data based on credibility of the human-posture key points, wherein the human posture confidence maps of the current frame of image data is configured to participate in generation of human posture confidence maps of a next frame of image data.

According to a technical solution of this embodiment, by acquiring a plurality of frames of image data, a plurality of human posture reference maps output by a human posture detection model are acquired responsive to inputting a current frame of image data to the human posture detection model with reference to human posture confidence maps of a previous frame of image data, wherein the human posture detection model is generated by training using a convolutional neutral network applicable to an embedded platform; human-posture key points in the human posture reference maps are identified; human posture confidence maps of the current frame of image data are generated based on credibility of the human-posture key points; whether the current frame of image data is a last frame of image data is judged; in a case where the current frame of image data is not the last frame of image data, the human posture confidence maps of the current frame of image data are input into the human posture detection model for participating in the generation of human posture confidence maps of a next frame of image data; and in a case where the current frame of image data is the last frame of image data, the generation of human posture confidence maps of the plurality of frames of image data is terminated, thereby implementing the human posture detection on the embedded platform. Meanwhile, an output result of the previous frame image data is introduced in a process of predicting an output result of the current frame of image data, which improves the prediction accuracy.

In some embodiments, the human posture reference map outputting module 420 includes a confidence map credibility judging unit, a first human posture reference map outputting unit, and a second human posture reference map outputting unit.

The first human posture reference map outputting unit is configured to acquire the plurality of human posture reference maps output by the human posture detection model responsive to inputting, in response to the human posture confidence maps of the previous frame of image data being credible, the current frame of image data and the human posture confidence maps of the previous frame of image data into the human posture detection model.

The second human posture reference map outputting unit is configured to acquire the plurality of human posture reference maps output by the human posture detection model responsive by inputting, in response to the human posture confidence maps of the previous frame of image data being incredible, the current frame of image data and target image data into the human posture detection model, wherein the target image data is image data containing no prior knowledge.

In some embodiments, each of the human posture reference maps includes a plurality of candidate points for the human-posture key point, and a coordinate position of each of the candidate points corresponds to one probability value. The human-posture key point identifying module 430 includes a human-posture key point identifying unit.

The human-posture key point identifying unit is configured to determine a coordinate position corresponding to a maximum probability value among the plurality of probability values, and take a candidate point corresponding to the coordinate position as the human-posture key point.

In some embodiments, the human posture confidence map generating module 440 includes a human-posture key point credibility judging unit, a first human posture confidence map generating unit, and a second human posture confidence map generating unit.

The first human posture confidence map generating unit is configured to generate, in response to the human-posture key points being credible, mask patterns with the human-posture key points as centers, as the human posture confidence maps.

The second human posture confidence map generating unit is configured to take, in response to the human-posture key points being incredible, the target image data as the human posture confidence maps, and taking the mask patterns as the human posture confidence maps.

In some embodiments, the human-posture key point credibility judging unit is configured to:
  determine, in response to the probability values corresponding to the human-posture key points being greater than the preset threshold value, that the human-posture key points are credible; and
  determine, in response to the probability values corresponding to the human-posture key points being less than or equal to the preset threshold value, that the human-posture key points are incredible.

In some embodiments, the human posture detection model includes a main path, a first branch, and a second branch, wherein the main path includes a residual module and an up-sampling module, the first branch includes a refinement network module, and the second branch includes a feedback module.

As for that the plurality of human posture reference maps output by the human posture detection model are acquired responsive to inputting the current frame of image data into the human posture detection model with reference to the human posture confidence maps of the previous frame of image data, it includes:
  acquiring a first convolution result output by the residual module based on a processing result of the residual module on the current frame of image data and a processing result of the feedback module on the human posture confidence maps of the previous image data;
  acquiring a second convolution result by inputting the first convolution result output by the residual module into the up-sampling module and processing the first convolution result therein, and acquiring a third convolution result by inputting the first convolution result output by the residual module into the refinement network module and processing the first convolution result therein; and acquiring the plurality of human posture reference maps by adding up the second convolution result and the third convolution result.

In some embodiments, the residual module includes a first residual unit, a second residual unit, and a third residual unit.

As for that the first convolution result output by the residual module is acquired based on the processing result of the residual module on the current frame of image data and the processing result of the feedback module on the human posture confidence maps of the previous image data, it includes:

acquiring a first intermediate result by inputting the current frame image data into the first residual unit and processing the current frame image data therein;

inputting the human posture confidence maps of the previous image data into the feedback module and processing the human posture confidence maps of the previous image data therein;

acquiring an addition result by adding up the first intermediate result and a processing result output by the feedback module;

acquiring a second intermediate result by inputting the addition result into the second residual unit and processing the addition result therein; and acquiring a third intermediate result by inputting the second intermediate result into the third residual unit and processing the second intermediate result therein, and taking the third intermediate result as the first convolution result.

The numbers of channels for the first intermediate result, the second intermediate result, and the third intermediate result are increased successively.

In some embodiments, the human posture detection model includes a third branch.

As for that the second convolution result is acquired by inputting the first convolution result output by the residual module into the up-sampling module and processing the first convolution result therein, it includes:

a fourth intermediate result is acquired by inputting the first intermediate result into the third branch and processing the first intermediate result therein;

a fifth intermediate result is acquired by inputting the second intermediate result into the third branch and processing the second intermediate result therein;

a sixth intermediate result is acquired by inputting the third intermediate result and the fifth intermediate result into the up-sampling module and processing the third intermediate result and the fifth intermediate result therein; and a seventh intermediate result is acquired by inputting the fourth intermediate result and the sixth intermediate result into the up-sampling module and processing the fourth intermediate result and the sixth intermediate result therein, and taking the seventh intermediate result as the second convolution result.

The numbers of channels for the sixth intermediate result and the seventh intermediate result are decreased successively.

In some embodiments, as for that the plurality of human posture reference maps are acquired by adding up the second convolution result and the third convolution result, it further includes:

acquiring a target result by adding up the first convolution result and the second convolution result;

acquiring the plurality of human posture reference maps by adding up the plurality of human posture reference maps and the target result.

The target result is intended to improve the accuracy of the human posture detection model when the human posture detection model is trained.

In some embodiments, the human posture detection model is generated by training using a convolutional neutral network applicable to an embedded platform.

In some embodiments, the apparatus further includes:

a first executing module, configured to input, in response to the current frame of image data being not the last frame of image data, the human posture confidence maps of the current frame of image data into the human posture detection model for participating in generation of human posture confidence maps of a next frame of image data; and a second executing module, configured to terminate, in response to the current frame of image data being the last frame of image data, generation of human posture confidence maps of the plurality of frames of image data.

The human posture detection apparatus according to the embodiments of the present disclosure may execute the human posture detection method according to any embodiment of the present disclosure.

Figure 5:
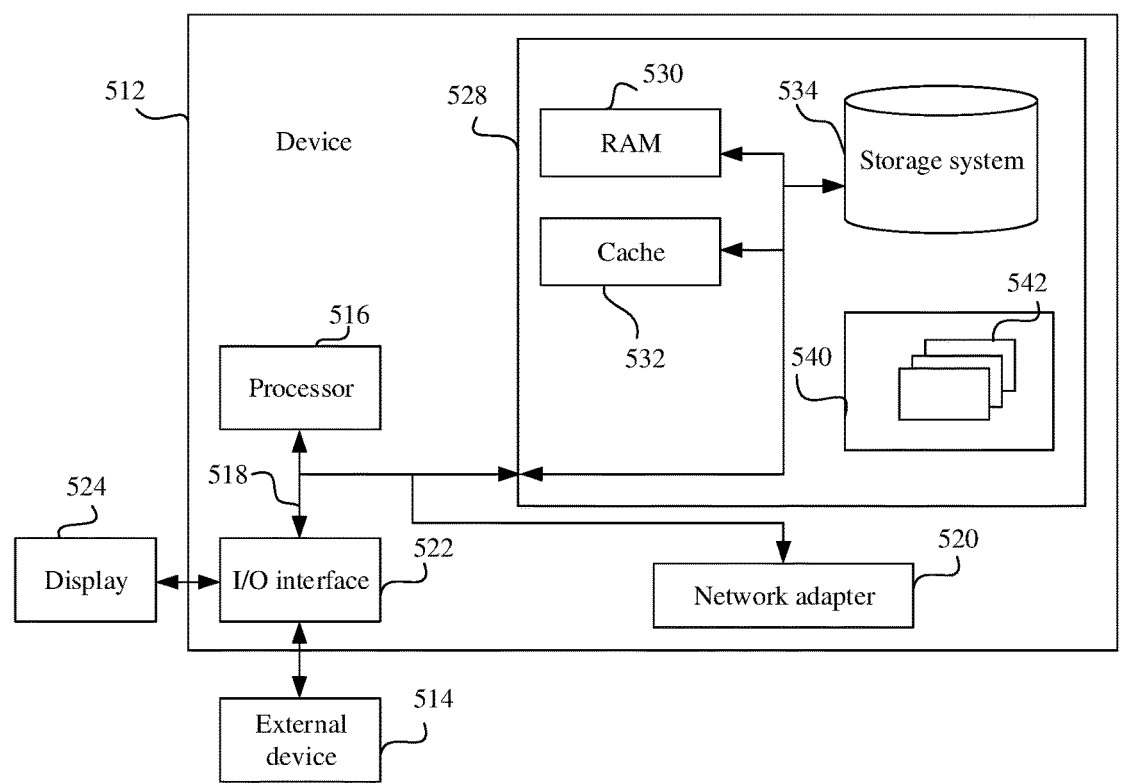
FIG. 5 is a schematic structural diagram of a device according to an embodiment of the present disclosure.

FIG. 5 is a schematic structural diagram of a device according to an embodiment of the present disclosure. FIG. 5 shows a block diagram of an exemplary device 512 suitable for implementing the embodiments of the present disclosure. As shown in FIG. 5, the device 512 may include but be not limited to the following components: at least one processor 516, a system memory 528, and a bus 518 connected to different system components (including the system memory 528 and the processor 516). The system memory 528 may include a computer-system-readable medium in the form of a volatile memory, such as at least one of a random-access memory (RAM) 530 and a cache memory 532. The device 512 may include other removable/non-removable, volatile/non-volatile computer system storage media. By way of example only, a storage system 534 may provide a hard disk drive, a magnetic disk drive, and an optical disk drive. In these cases, each drive may be connected to the bus 518 via at least one data medium interface. A program/utility tool 540 having a set of (at least one) program module 542 may be stored in, for example, the memory 528, and the program module 542 typically executes the functions and/or methods in the embodiments described in the present disclosure. The device 512 may also communicate with at least one external device 514 (for example, a keyboard, a pointing device, a display 524, etc.), and may also communicate with at least one device that enables a user to interact with the device 512, and/or communicate with any device (such as a network card, a modem, etc.) that enables the device 512 to communicate with at least one of other computing devices. Such communications may be performed via an input/output (I/O) interface 522. In addition, the device 512 may also communicate with at least one or more networks (for example, a local area network (LAN), a wide area network (WAN), and/or a public network, such as the Internet) through a network adapter 520. The processor 516 executes various functional applications and data processing by running programs stored in the system memory 528, for example, to implement the method for detecting the human posture according to any embodiment of the present disclosure.

The embodiments of the present disclosure further provide a computer-readable storage medium storing at least one computer program therein. The computer program, when executed by a processor, implements the method for detecting the human posture according to any embodiment of the present disclosure.

What is claimed is:

1. A human posture detection method, comprising:
acquiring a plurality of frames of image data;
acquiring a plurality of human posture reference maps output by a human posture detection model responsive to inputting a current frame of image data to the human posture detection model with reference to human posture confidence maps of a previous frame of image data, wherein different human posture reference maps correspond different human-posture key points;
identifying a human-posture key point in each of the human posture reference maps; and
generating human posture confidence maps of the current frame of image data based on credibility of the human-posture key points, wherein the human posture confidence maps of the current frame of image data is configured to participate in generation of human posture confidence maps of a next frame of image data,
wherein the human posture detection model comprises a main path, a first branch, and a second branch, the main path comprising a residual module and an up-sampling module, the first branch comprising a refinement network module, and the second branch comprising a feedback module; and
acquiring the plurality of human posture reference maps output by the human posture detection model responsive to inputting the current frame of image data into the human posture detection model with reference to the human posture confidence maps of the previous frame of image data comprises:
acquiring a first convolution result output by the residual module based on a processing result of the residual module on the current frame of image data and a processing result of the feedback module on the human posture confidence maps of the previous image data;
acquiring a second convolution result by inputting the first convolution result output by the residual module into the up-sampling module and processing the first convolution result therein, and acquiring a third convolution result by inputting the first convolution result output by the residual module into the refinement network module and processing the first convolution result therein; and
acquiring the plurality of human posture reference maps by adding up the second convolution result and the third convolution result.

2. The method according to claim 1, wherein acquiring the plurality of human posture reference maps output by the human posture detection model responsive to inputting the current frame of image data to the human posture detection model with reference to the human posture confidence maps of the previous frame of image data comprises:
acquiring the plurality of human posture reference maps output by the human posture detection model responsive to inputting, in response to the human posture confidence maps of the previous frame of image data being credible, the current frame of image data and the human posture confidence maps of the previous frame of image data into the human posture detection model; and acquiring the plurality of human posture reference maps output by the human posture detection model responsive by inputting, in response to the human posture confidence maps of the previous frame of image data being incredible, the current frame of image data and target image data into the human posture detection model, wherein the target image data is image data containing no prior knowledge.

3. The method according to claim 1, wherein each of the human posture reference maps comprises a plurality of candidate points for the human-posture key point, and a coordinate position of each of the candidate points corresponds to one probability value; and
identifying the human-posture key points in each of the human posture reference maps comprises:
determining a coordinate position corresponding to a maximum probability value among a plurality of probability values, and taking a candidate point corresponding to the coordinate position as the human-posture key point.

4. The method according to claim 2, wherein generating the human posture confidence maps of the current frame of image data based on the credibility of the human-posture key points comprises:
generating, in response to the human-posture key points being credible, mask patterns with the human-posture key points as centers, and taking the mask patterns as the human posture confidence maps; and
taking, in response to the human-posture key points being incredible, the target image data as the human posture confidence maps.

5. The method according to claim 4, further comprising:
determining, in response to probability values corresponding to the human-posture key points being greater than a preset threshold value, that the human-posture key points are credible; and
determining, in response to the probability values corresponding to the human-posture key points being less than or equal to the preset threshold value, that the human-posture key points are incredible.

6. The method according to claim 1, wherein the residual module comprises a first residual unit, a second residual unit, and a third residual unit; and
acquiring the first convolution result output by the residual module based on a processing result of the residual module on the current frame of image data and a processing result of the feedback module on the human posture confidence maps of the previous image data comprises:
acquiring a first intermediate result by inputting the current frame image data into the first residual unit and processing the current frame image data therein;
inputting the human posture confidence maps of the previous image data into the feedback module and processing the human posture confidence maps of the previous image data therein;
acquiring an addition result by adding up the first intermediate result and a processing result output by the feedback module;
acquiring a second intermediate result by inputting the addition result into the second residual unit and processing the addition result therein; and
acquiring a third intermediate result by inputting the second intermediate result into the third residual unit and processing the second intermediate result therein, and taking the third intermediate result as the first convolution result;

wherein numbers of channels for the first intermediate result, the second intermediate result, and the third intermediate result are increased successively.

7. The method according to claim 6, wherein the human posture detection model further comprises a third branch; and
acquiring the second convolution result by inputting the first convolution result output by the residual module into the up-sampling module and processing the first convolution result therein comprise:
acquiring a fourth intermediate result by inputting the first intermediate result into the third branch and processing the first intermediate result therein;
acquiring a fifth intermediate result by inputting the second intermediate result into the third branch and processing the second intermediate result therein;
acquiring a sixth intermediate result by inputting the third intermediate result and the fifth intermediate result into the up-sampling module and processing the third intermediate result and the fifth intermediate result therein; and
acquiring a seventh intermediate result by inputting the fourth intermediate result and the sixth intermediate result into the up-sampling module and processing the fourth intermediate result and the sixth intermediate result therein, and taking the seventh intermediate result as the second convolution result;
wherein numbers of channels for the sixth intermediate result and the seventh intermediate result are decreased successively.

8. The method according to claim 1, acquiring the plurality of human posture reference maps by adding up the second convolution result and the third convolution result further comprises:
acquiring a target result by adding up the first convolution result and the second convolution result; and
acquiring the plurality of human posture reference maps by adding up the plurality of human posture reference maps and the target result.

9. The method according to claim 1, wherein the human posture detection model is generated by training using a convolutional neutral network applicable to an embedded platform.

10. The method according to claim 1, further comprising:
inputting, in response to the current frame of image data being not the last frame of image data, the human posture confidence maps of the current frame of image data into the human posture detection model; and
terminating, in response to the current frame of image data being the last frame of image data, generation of human posture confidence maps of the plurality of frames of image data.

11. A device, comprising:
at least one processor; and
a memory configured to store at least one program,
wherein the at least one processor, when running the at least one program, is caused to perform a human posture detection method comprising:
acquiring a plurality of frames of image data;
acquiring a plurality of human posture reference maps output by a human posture detection model responsive to inputting a current frame of image data to the human posture detection model with reference to human posture confidence maps of a previous frame of image data, wherein different human posture reference maps correspond different human-posture key points;
identifying a human-posture key point in each of the human posture reference maps; and
generating human posture confidence maps of the current frame of image data based on credibility of the human-posture key points, wherein the human posture confidence maps of the current frame of image data is configured to participate in generation of human posture confidence maps of a next frame of image data,
wherein the human posture detection model comprises a main path, a first branch, and a second branch, the main path comprising a residual module and an up-sampling module, the first branch comprising a refinement network module, and the second branch comprising a feedback module; and
acquiring the plurality of human posture reference maps output by the human posture detection model responsive to inputting the current frame of image data into the human posture detection model with reference to the human posture confidence maps of the previous frame of image data comprises:
acquiring a first convolution result output by the residual module based on a processing result of the residual module on the current frame of image data and a processing result of the feedback module on the human posture confidence maps of the previous image data;
acquiring a second convolution result by inputting the first convolution result output by the residual module into the up-sampling module and processing the first convolution result therein, and acquiring a third convolution result by inputting the first convolution result output by the residual module into the refinement network module and processing the first convolution result therein; and
acquiring the plurality of human posture reference maps by adding up the second convolution result and the third convolution result.

12. The device according to claim 11, wherein acquiring the plurality of human posture reference maps output by the human posture detection model responsive to inputting the current frame of image data to the human posture detection model with reference to the human posture confidence maps of the previous frame of image data comprises:
acquiring the plurality of human posture reference maps output by the human posture detection model responsive to inputting, in response to the human posture confidence maps of the previous frame of image data being credible, the current frame of image data and the human posture confidence maps of the previous frame of image data into the human posture detection model; and
acquiring the plurality of human posture reference maps output by the human posture detection model responsive by inputting, in response to the human posture confidence maps of the previous frame of image data being incredible, the current frame of image data and target image data into the human posture detection model, wherein the target image data is image data containing no prior knowledge.

13. The device according to claim 12, wherein generating the human posture confidence maps of the current frame of image data based on the credibility of the human-posture key points comprises:
generating, in response to the human-posture key points being credible, mask patterns with the human-posture key points as centers, and taking the mask patterns as the human posture confidence maps; and taking, in response to the human-posture key points being incredible, the target image data as the human posture confidence maps.

14. The device according to claim 11, wherein each of the human posture reference maps comprises a plurality of candidate points for the human-posture key point, and a coordinate position of each of the candidate points corresponds to one probability value; and
identifying the human-posture key points in each of the human posture reference maps comprises:
determining a coordinate position corresponding to a maximum probability value among a plurality of probability values, and taking a candidate point corresponding to the coordinate position as the human-posture key point.

15. The device according to claim 11, wherein the residual module comprises a first residual unit, a second residual unit, and a third residual unit; and
acquiring the first convolution result output by the residual module based on a processing result of the residual module on the current frame of image data and a processing result of the feedback module on the human posture confidence maps of the previous image data comprises:
acquiring a first intermediate result by inputting the current frame image data into the first residual unit and processing the current frame image data therein;
inputting the human posture confidence maps of the previous image data into the feedback module and processing the human posture confidence maps of the previous image data therein;
acquiring an addition result by adding up the first intermediate result and a processing result output by the feedback module;
acquiring a second intermediate result by inputting the addition result into the second residual unit and processing the addition result therein; and
acquiring a third intermediate result by inputting the second intermediate result into the third residual unit and processing the second intermediate result therein, and taking the third intermediate result as the first convolution result;
wherein numbers of channels for the first intermediate result, the second intermediate result, and the third intermediate result are increased successively.

16. The device according to claim 15, wherein the human posture detection model further comprises a third branch; and
acquiring the second convolution result by inputting the first convolution result output by the residual module into the up-sampling module and processing the first convolution result therein comprise:
acquiring a fourth intermediate result by inputting the first intermediate result into the third branch and processing the first intermediate result therein;
acquiring a fifth intermediate result by inputting the second intermediate result into the third branch and processing the second intermediate result therein;
acquiring a sixth intermediate result by inputting the third intermediate result and the fifth intermediate result into the up-sampling module and processing the third intermediate result and the fifth intermediate result therein; and
acquiring a seventh intermediate result by inputting the fourth intermediate result and the sixth intermediate result into the up-sampling module and processing the fourth intermediate result and the sixth intermediate result therein, and taking the seventh intermediate result as the second convolution result;
wherein numbers of channels for the sixth intermediate result and the seventh intermediate result are decreased successively.

17. The device according to claim 11, wherein the method further comprises:
inputting, in response to the current frame of image data being not the last frame of image data, the human posture confidence maps of the current frame of image data into the human posture detection model; and
terminating, in response to the current frame of image data being the last frame of image data, generation of human posture confidence maps of the plurality of frames of image data.

18. A non-transitory computer-readable storage medium storing at least one computer program therein, wherein the computer program, when run by a processor, causes the processor to perform a human posture detection method comprising:
acquiring a plurality of frames of image data;
acquiring a plurality of human posture reference maps output by a human posture detection model responsive to inputting a current frame of image data to the human posture detection model with reference to human posture confidence maps of a previous frame of image data, wherein different human posture reference maps correspond different human-posture key points;
identifying a human-posture key point in each of the human posture reference maps; and
generating human posture confidence maps of the current frame of image data based on credibility of the human-posture key points, wherein the human posture confidence maps of the current frame of image data is configured to participate in generation of human posture confidence maps of a next frame of image data,
wherein the human posture detection model comprises a main path, a first branch, and a second branch, the main path comprising a residual module and an up-sampling module, the first branch comprising a refinement network module, and the second branch comprising a feedback module; and
acquiring the plurality of human posture reference maps output by the human posture detection model responsive to inputting the current frame of image data into the human posture detection model with reference to the human posture confidence maps of the previous frame of image data comprises:
acquiring a first convolution result output by the residual module based on a processing result of the residual module on the current frame of image data and a processing result of the feedback module on the human posture confidence maps of the previous image data;
acquiring a second convolution result by inputting the first convolution result output by the residual module into the up-sampling module and processing the first convolution result therein, and acquiring a third convolution result by inputting the first convolution result output by the residual module into the refinement network module and processing the first convolution result therein; and
acquiring the plurality of human posture reference maps by adding up the second convolution result and the third convolution result.

* * * * *